United States Patent [19]
Kashio

[11] 3,796,865
[45] Mar. 12, 1974

[54] APPARATUS FOR AUTOMATICALLY PROCESSING SCORES OF BOWLING GAMES

[75] Inventor: Toshio Kashio, Tokyo, Japan

[73] Assignee: Casio Computer Co., Ltd., Tokyo, Japan

[22] Filed: Nov. 10, 1972

[21] Appl. No.: 305,280

[30] Foreign Application Priority Data
Nov. 11, 1971 Japan .................................. 46-90162

[52] U.S. Cl. ...... 235/92 GA, 235/92 SH, 235/92 R, 273/54 C
[51] Int. Cl. .............................................. A63d 5/04
[58] Field of Search .................... 235/92 GA, 92 SH; 273/54 C

[56] References Cited
UNITED STATES PATENTS
3,516,665 6/1970 Danielson ...................... 235/92 GA
3,300,213 1/1967 Miller ............................... 273/54 C

*Primary Examiner*—Gareth D. Shaw
*Assistant Examiner*—Joseph M. Thesz, Jr.
*Attorney, Agent, or Firm*—Kemon, Palmer & Estabrook

[57] ABSTRACT

The apparatus comprises a dynamic shift register constructed to continuously store signals concerning the results of throwing a ball for at least one game, means for successively reading out information from an output section of the shft register, means for successively summing up the number of fallen pins which are read out by the read out means starting from the first frame, discriminating means for deriving out a strike signal and a spare signal from the information read out from the output section, means responsive to the output signal from the discriminating means for reading out the information concerning the result of the first throw or first and second throws succeeding to the first mentioned information read out from the output section, a sum up counter for adding the number of fallen pins corresponding to the second mentioned information to the result of the operation of the sum up means and dynamic display means for successively displaying the information from the dynamic shift register and the sum up counter for respective frames.

1 Claim, 13 Drawing Figures

APPARATUS FOR AUTOMATICALLY PROCESSING SCORES OF BOWLING GAMES

BACKGROUND OF THE INVENTION

This invention relates to improved apparatus for automatically processing and displaying the scores of respective players of a bowling game.

To make a record of the bowling game, it is necessary to count the number of fallen pins at each throw of the player, to record discriminatively strike, spare, etc. on a score sheet, to count the number of marks obtained or score and to record the score. Usually, several players play as a group, and while one player plays frame after frame another player records the score of said one player on a score sheet. Thus, the scores of a plurality of different players are recorded on the same sheet so that the recording operation is troublesome and miss-recording and hence miss calculation are often resulted.

To eliminate such disadvantages it has been developed a recording system wherein each player is required to merely operate a key which indicates that the player is now playing and wherein the number of fallen pins is automatically counted and recorded on a score sheet for the player. According to this system, a signal representing the player and a signal produced by a pin setter of the bowling apparatus and indicating the number of fallen pins are sent to a central processing apparatus which operates the scores of respective players and sends the result of operation to terminal apparatus of respective lanes for recording.

Such a prior processing system, however, requires a large central processing apparatus and terminal apparatus at the ends of respective lanes thereby greatly complicating and the construction and increasing the cost of the system. Particularly, as it is difficult to memorize in the central processing apparatus all scores of the games of respective players, each time a ball is thrown a summed up score is recorded. For this reason, it is necessary to provide an automatic recording device for each terminal apparatus thus complicating the same. In addition, it is impossible to correct an erroneous counting operation of the number of fallen pins because calculation and recording are made for each throwing operation.

SUMMARY OF THE INVENTION

Accordingly, it is an object of this invention to provide an improved apparatus for automatically processing the scores of a bowling game which cam eliminate various difficulties described above, has a simple construction, can be installed at each lane and is constructed to count the number of fallen pins and to correct the result of counting.

A further object of this invention is to provide an improved apparatus for automatically processing the scores of a bowling game capable of successively displaying the scores of respective frames without the necessity of controlling the calculating operations for the results of respective throws and of storing the process of recording the scores.

In accordance with this invention, there is provided apparatus for automatically processing the scores of bowling games comprising a dynamic shift register constructed to continuously store signals concerning the results of throwing balls for at least one game, means for successively reading out information from an output section of the shift register, means for successively summing up the number of fallen pins which are read out by the read out means starting from the first frame, discriminating means for deriving out a strike signal and a spare signal from the information read out from the output signal from the discriminating means for reading out the information concerning the result of the first throw or first and second throws succeeding to the first mentioned information read out from the output section, a sum up counter for adding the number of fallen pins corresponding to the second mentioned information to the result of the operation of the sum up means and dynamic display means for successively displaying the information from the dynamic shift register and the sum up counter for respective frames.

DESCRIPTION OF THE PREFERRED EMBODIMENT

Figure 1A:
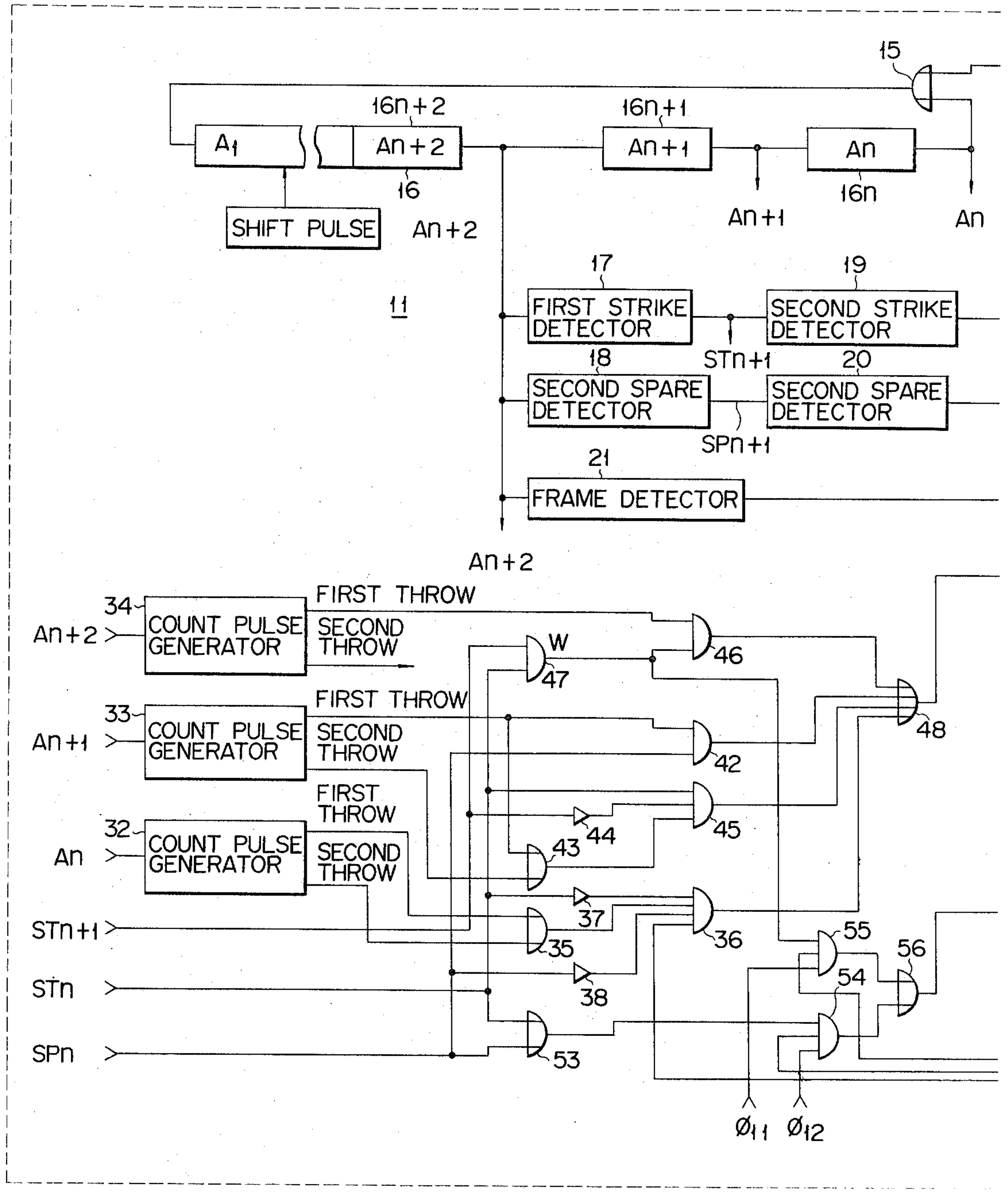
FIGS. 1*a* and 1*b* show a block diagram of one embodiment of this invention.
Figure 1B:
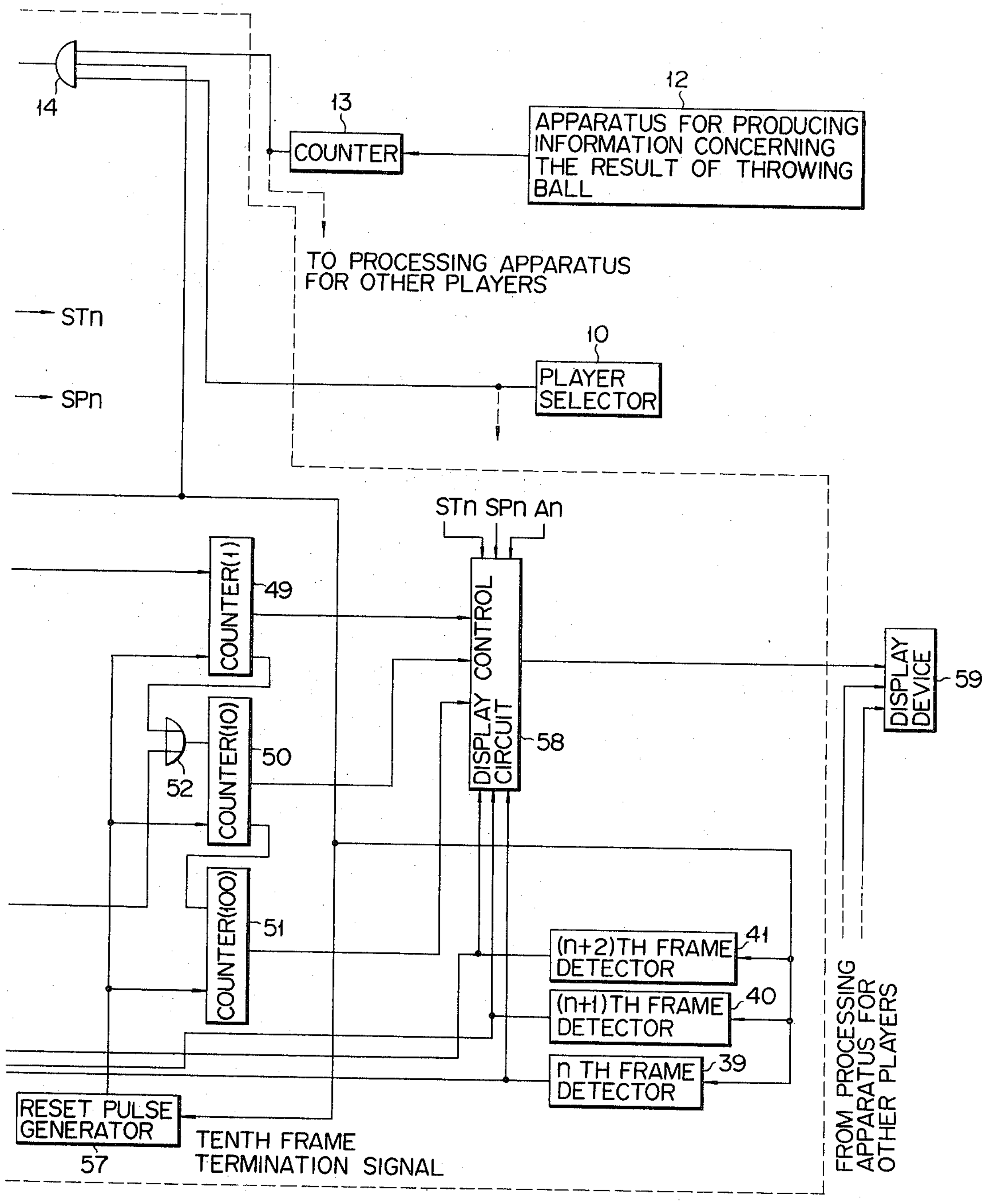

Referring now to FIG. 1 of the accompanying drawings, a block bounded by dotted lines shows processing apparatus 11 for each player.

Although six such processing apparatus are provided for each lane assuming that six players use the lane, only one processing apparatus 11 is shown herein for the sake of simplicity. Each of the processing apparatus is provided with a player selector 10, apparatus 12 associated with a pin setter for producing an information concerning the result of throwing balls and a counter 13 for counting the number of the information generated by apparatus 12. The counter 13 supplies to an AND gate circuit 14 pulse signals of the number corresponding to the number of fallen pins. Signals from the player selector 10 are also supplied to the AND gate circuit 14, and the output from this AND gate circuit is supplied to the input terminal of a dynamic shift register 16 through an OR gate circuit 15. The dynamic shift register 16 is constructed such that it stores information for each frame and includes twelve bits for storing information of one frame. In this example, it can memorize the result of throw of a maximum information for each game. The output signal from the dynamic shift register 16 is applied to the OR gate circuit 15 whereby many items of information stored in the register 16 are caused to dynamically circulate through it by a shift signal (not shown) applied thereto. From the shift register 16 can be simultaneously read out the contents of two words An + 1 and An + 2 corresponding to two frames from two sections 16*n* + 1 and 16*n*

+ 2 succeeding to an output word An from the output section 16$n$. Assuming now that the word An represents the information of the first frame, then the word An + 1 represents the information of the second frame and the word An + 2 that of the third frame. The stored word An + 2 is applied to a first strike detector 17 having the same signal delay time as the section 16$n$ + 1 and to a first spare detector 18 so that when the output An + 1 from the section 16$n$ + 1 corresponds to a strike or a spare, then there are produced outputs STn + 1 and SPn + 1, at the respective output sides. The outputs from the detectors 17 and 18 are applied to a second strike detector 19 and a second spare detector 20, respectively, having the same signal delay time as the section 16$n$, so that when the information content of the output word An represents a strike or a spare, detectors 19 and 20 produce outputs STn and SPn, respectively.

Further, the output from the section 16n + 2 of the dynamic shift register 16 is applied to a frame detector 21 so as to apply a gate signal to the AND gate circuit 14 when an unoccupied or vacant section corresponding to the next frame arrives at the input section of the shift register 16 whereby the content of the counter 13 is written in the input section of the shift register 16 through AND gate circuit 14 and OR gate circuit 15.

The information concerning the result of throwing balls and is to be stored in the dynamic shift register 16 will be described hereunder with reference to FIG. 2. As above described, an information for one frame is comprised by 12 bits and the counter 13 consists of 12 bits. At the initial condition wherein any result of throw is not yet stored, a "1" signal is stored in the first bit. Under these conditions, when three pins are fallen by the first throw, the 1 signal will be shifted three bits by three pulses from apparatus 12 and the shifted 1 signal is stored in the fourth bit of the input section of shift register 16, as shown in FIG. 2B. When five pins are fallen by the second throw, pulses shifting the register 16 to a position corresponding to the number of fallen pins plus 1 from the position of the first throw are generated from counter 13. Pulses from counter 13 are supplied to the shift register 16 at a position corresponding to the frame so that the 1 signal is shifted five bits to be stored in the tenth bit, as shown in FIG. 2C. In the case of a strike, the 1 signal will appear at the eleventh bit as shown in FIG. 2D. In the case of a spare, for example, when eight pins are fallen by the first throw, the 1 signal will appear at the ninth bit and the twelfth bit. FIG. 2F shows clock signals $\phi_1$ through $\phi_{12}$ corresponding to respective bits.

Accordingly, the first strike detector 17 and the first spare detector 18 read out the contents of twelve bits corresponding to the clock pulses $\phi_1$ through $\phi_{12}$ with the result that when the 1 signal appears in the twelfth bit a spare signal SPn + 1 is read out, whereas when the 1 signal appears in the eleventh bit alone, a strike signal STn + 1 is read out.

Figure 3:
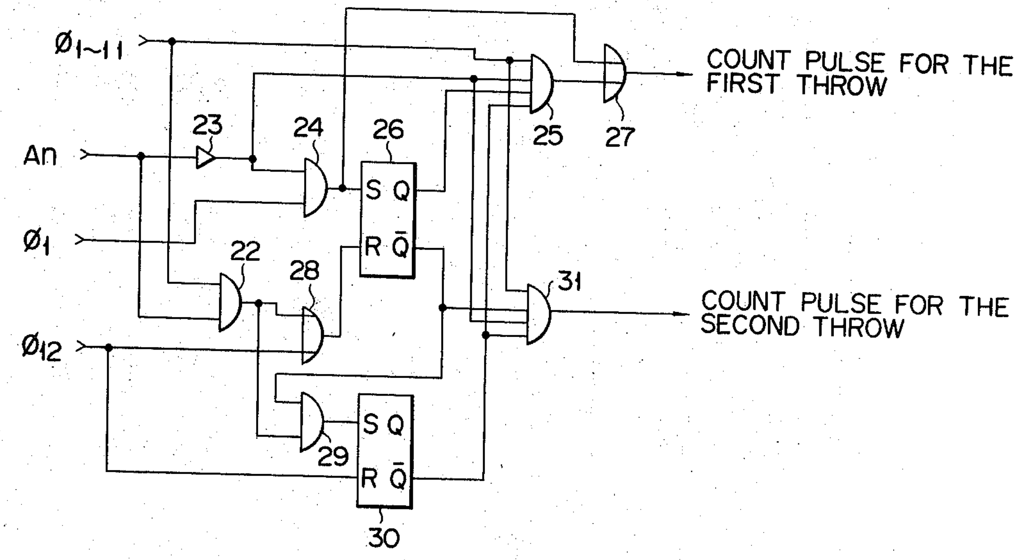
FIG. 3 shows a block diagram of a count pulse generator used in the embodiment shown in FIG. 1.

Signals corresponding to the number of the fallen pins at the first and second throws are generated by a count pulse generating circuit shown in FIG. 3. In this example, a case wherein the numbers of the fallen pins at the first and second throws of the output word An will be considered. The twelve bit information An from the output section 16n is applied to an AND gate circuit 22 together with the clock pulses $\phi_1$ through $\phi_{11}$.

The information An is also applied to respective input terminals of AND gate circuits 24 and 25 via an inverter 23. Clock pulse $\phi_1$ is applied to the other input of AND gate circuit 24 whereas clock pulse $\phi_{12}$ is applied to one input of an OR gate circuit 28 together with the output from AND gate circuit 22. The output from AND gate circuit 24 is supplied to the set terminals of a flip-flop circuit 26, whereas the output from OR gate circuit 28 to the reset terminal R of the flip-flop circuit 26. The output from AND gate circuit 22 is applied to an AND gate circuit 29 together with the $\bar{Q}$ output from the flip-flop circuit 26, and the output from AND gate circuit 29 is applied to the set terminal S of a flip-flop circuit 30 whose reset terminal R is connected to receive $\phi_{12}$ clock pulse. The $\bar{Q}$ output of the flip-flop circuit 30 is applied to respective input terminals of AND gate circuits 25 and 31 and the output from AND gate circuit 25 is applied to an OR gate circuit 27 together with the output from AND gate circuit 24. The output from the OR gate circuit 27 is used as the count pulse for the first throw whereas the output from AND gate circuit 31 as the count pulse for the second throw.

Figures 2A, 2B, 2C, 2D, 2E, 2F:
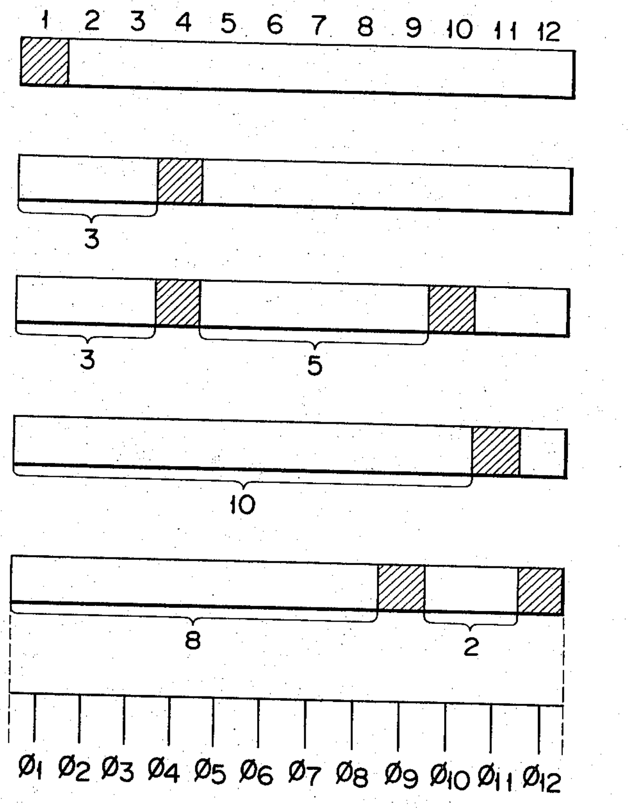
FIGS. 2A through 2F are diagrams showing one example of the information regarding the result of throw utilized in the embodiment shown in FIG. 1.

In the operation of the count pulse generator, it is assumed that the twelve bit signal of the word An in a condition shown in FIG. 2C is applied to the count pulse generator together with clock pulse $\phi_1$ through $\phi_{12}$. When clock pulse $\phi$ is received, the register provides an "0" signal and the inverter 23 produces a 1 signal thereby setting flip-flop circuit 26. At this time, flip-flop circuit 30 is in its reset state. Accordingly, AND gate circuit 25 passes clock pulse $\phi_1$ and succeeding clock pulses to produce the count pulse for the first throw by OR gate circuit 27. Under these conditions, upon receipt of the clock pulse $\phi_4$, the signal of the word An of the shift register 16 becomes 1 whereby AND gate circuit 25 is enabled and AND gate circuit 22 disenabled thereby resetting the flip-flop circuit 26. Accordingly, three pulses $\phi_1$, $\phi_2$ and $\phi_3$ are produced by AND gate circuit 25 thus producing a count pulse output signal which shows that three pins were fallen by the first throw.

When the flip-flop circuit 26 is reset, AND gate circuit 31 is enabled. At this time, a gate signal is applied to AND gate circuit 29 but as the AND gate circuit 22 produces a 0 signal, flip-flop circuit 30 is maintained in its reset state. When clock pulse $\phi_5$ and succeeding clock pulses arrive at the count pulse generator, the word An in the shift register 16 is read out and AND gate circuit 31 produces count pulse signals for the second throw of the number corresponding to read out 0 signal. Upon arrival of clock pulse $\phi_{11}$ the signal of the word An becomes 1 whereby AND gate circuits 22 and 29 are enabled to set flip-flop circuit 30 whereas AND gate circuit 31 is disenabled to terminate the count pulse output for the second throw.

More particularly, when the content of the output An of the shift register 16 is shown by FIG. 2C, three pulses are obtained through OR gate circuit 27 and five pulses are obtained through AND gate circuit 31 thus showing that three pins were fallen by the first throw and five pins were fallen by the second throw. Since flip-flop circuit 26 is set when the clock pulse $\phi_1$ is received, the OR gate circuit 27 is provided for the purpose of producing a count pulse when clock pulse $\phi_1$ is received.

Referring again to FIG. 1, the outputs An, An + 1 and An + 2 are applied to first to third count pulse generators 32, 33 and 34, respectively, which are constructed similar to that shown in FIG. 3. The signals produced by the first and second throws are applied to AND gate circuit 36 via OR gate circuit 35. Further, the AND gate circuit 36 is supplied with the output STn from the second strike detector 19 and the output SPn from the second spare detector 20 respectively through inverters 37 and 38 and the output from an nth frame detector 39 driven by the output of the frame 21 is applied to AND gate circuit 36 to act as the gate signal. The output signal generated by the second count pulse generator 32 corresponding to the first throw is supplied to AND gate circuit 42 which is connected to receive the spare signal SPn as the gate signal and a signal corresponding to the second throw is supplied to an OR gate circuit 43 together with the signal corresponding to the first throw. The output signal from the OR gate circuit 43 is supplied to an AND gate circuit 45 together with the strike signal STn and a signal produced by inverting the strike signal STn + 1 of the $(n + 1)$th frame by means of an inverter 44.

The third count pulse generator 34 produces only a signal corresponding to the first throw which is supplied to an AND gate circuit 46. The AND gate circuit 46 also receives the output signal of AND gate circuit 47 as a gate signal, the AND gate circuit 47 being supplied with strike signals STn and STn + 1. The output signals from AND gate circuits 36, 42, 45 and 46 are applied to an OR gate circuit 43 and the output thereof is supplied to a first digit counter 49. Further, there are provided a counter 50 for the digits of the order of tens and a counter 51 for the digits of the order of hundreds. These counters are constructed such that shift pulses are supplied to counter 50 from counter 49 and to counter 51 from counter 50. The shift signal from counter 49 is supplied to counter 50 together with the output signal from OR gate circuit 56 through an OR gate circuit 52. More particularly, the strike signal STn and the spare signal SPn are derived out through an OR gate circuit 53 and the output from this OR gate circuit is applied to AND gate circuit 54 together with the twelfth clock pulse $\phi_{12}$ and the signal from $(n + 1)$th frame termination detector 40. The output from AND gate circuit 47, clock pulse $\phi_{11}$ and the output from an $(n + 2)$th frame termination detector 41 are applied to an AND gate circuit 55. The output signal from AND gate circuit 55 is applied to an OR gate circuit 56 together with the output from the AND gate circuit 54. Counters 49, 50 and 51 are connected to receive the signal of a reset pulse generator 57 which is driven by the tenth frame termination signal from the frame detector 21.

The counting circuit consisting of counters 49, 50 and 51 operates to count the numerical data of the score included in the output An and this numerical data is sent to a display control circuit 58 which is connected to receive the strike signal STn, the spare signal SPn and the outputs from the frame termination detectors 39, 40 and 41. The output of the display control circuit 58 is sent to a display device 59 which is common to respective players thereby displaying the number of fallen pins at respective frames and the total score as the content of the shift register is shifted. The display device may comprise, for example, a display device utilizing a storage type cathode ray tube, whereby all scores are displayed by circulating the content of the dynamic shift register 16. If desired, it is possible to record the scores on a score sheet.

Figure 4:
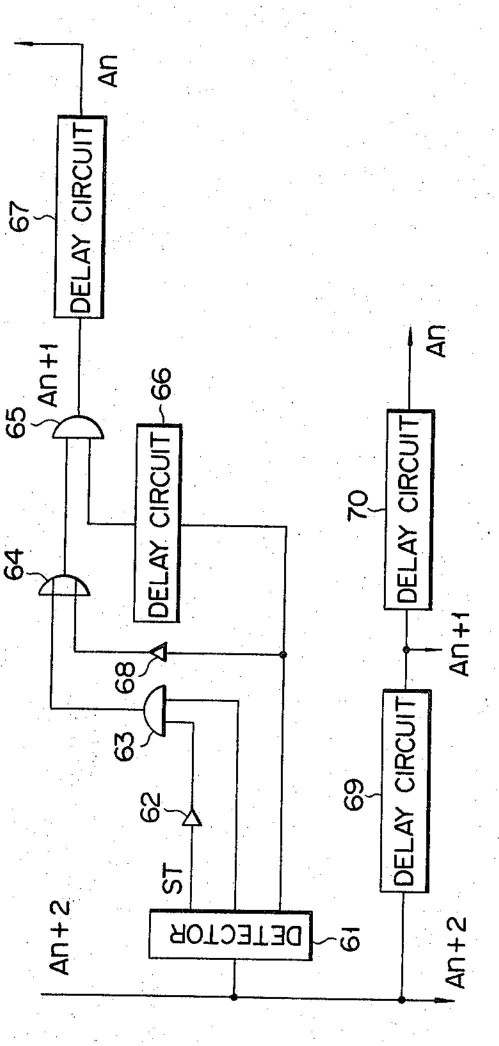
FIG. 4 shows a block diagram of a frame detector shown in FIG. 1.

FIG. 4 illustrates one example of the frame detector 21. The information An + 2 from the section 16n + 2 of the dynamic shift register 16 shown in FIG. 1 is applied to a detector 61 which is provided for the purpose of obtaining the strike signal ST and an output representing the presence or absence of the numerical data of the first throw and An + 2. The circuit for producing the strike signal ST may be constructed similar to the first and second strike detectors 17 and 19 shown in FIG. 1 whereas the circuit for detecting the presence of absence of the first throw and the numerical data may be constructed to be similar to the count pulse generator shown in FIG. 3. Where the information An + 1 corresponds to the first throw other than a strike, strike signal ST inverted by an inverter 62 and a first throw signal $TH_1$ will be applied to an OR gate circuit 64 through an AND gate circuit 63 and the output from OR gate circuit 64 is coupled to one input of an AND gate circuit 65. Since a signal representing the presence of a numerical data is applied to the other input of the AND gate circuit 65 via a delay circuit 66 which delays the signal by one frame, the AND gate circuit 65 produces a detection signal of the first throw of (An + 1)th frame. This output is passed through a delay circuit 67 which also delays the signal by one frame for producing a detection signal of the first throw of (An)th frame. Thus, in the appearance of this output at the portion 16n, a signal for the second throw of the frame is to be applied to the contents An. Where the information of An + 2 contains a numerical data the delay circuit 66 produces an output, whereas when the information contains no data being recorded, the output from inverter 68 is sent to AND gate circuit 65 through OR gate circuit 64 so that in this case, too, a frame designation signal is formed. On the other hand, in the case of a strike, as the AND gate circuit 63 is disenabled, the frame designation signal will be blocked. Accordingly, the AND gate circuit 14 shown in FIG. 1 will be maintained in its disenabled state until a frame designation is made by the numerical data presence signal at this time and a succeeding numerical data absence signal. The information An + 2 is sent to the $(n + 2)$th frame termination detector 41 shown in FIG. 1 and the information An + 1 passed through one frame delay circuit 69 is sent to the (n + 1)th frame termination detector 40 whereas the information passed through another one frame delay circuit 70 is applied to the nth frame termination detector 39. The tenth frame detector 57 is made up of a counter, for example, and commences to count the shift pulse for the dynamic shift register 16 in accordance with the first frame designation signal thereby producing a reset pulse when counting of all bits of the shift register 16 is completed.

Figure 5:
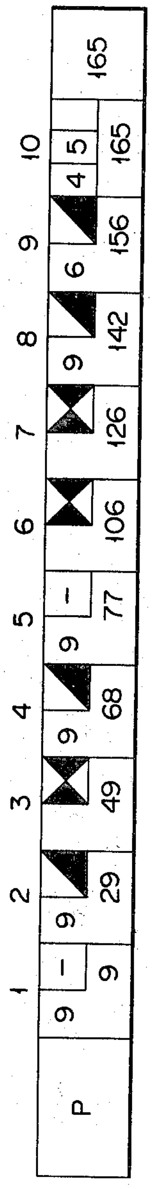
FIG. 5 shows one example of the score for explaining the operation of the embodiment shown in FIG. 1.
Figure 6:
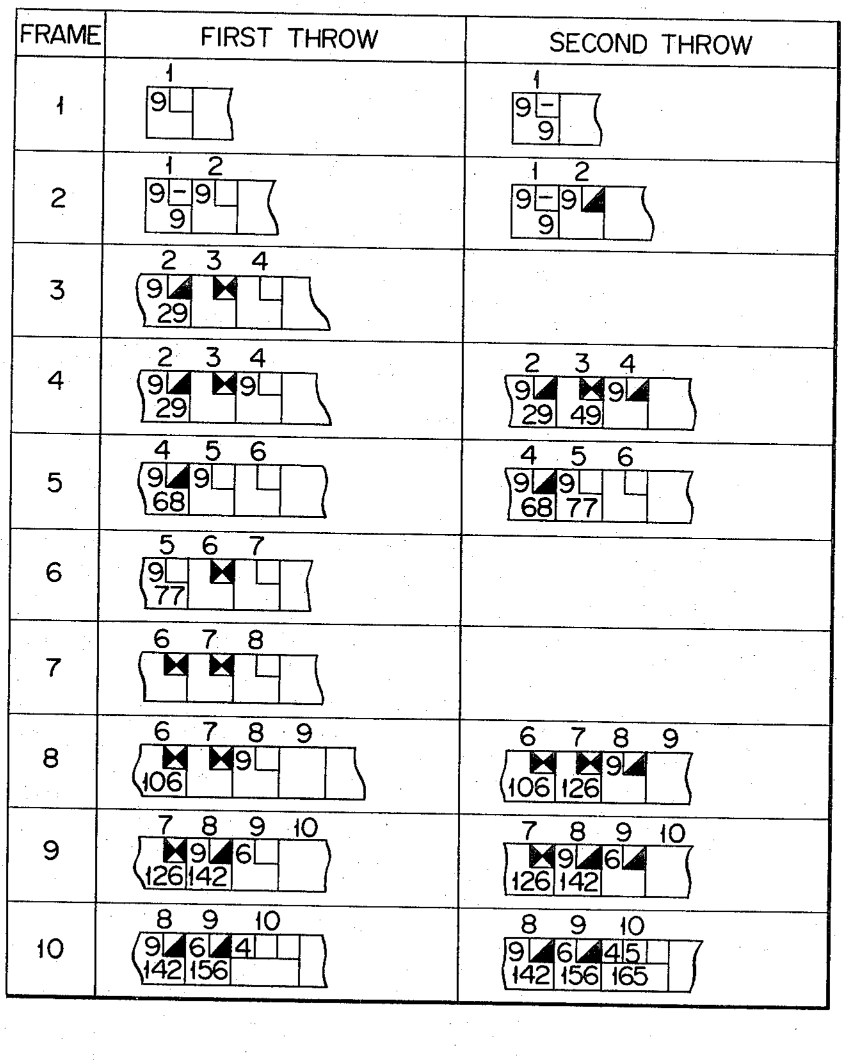
FIG. 6 is a diagram showing the manner of displaying the content of the score shown in FIG. 5 on a display device.

In describing the operation of the processing apparatus, it is assumed that the score of the game of a player P is shown by FIG. 5, for example. At the first frame, the player operates player selector 10 assigned to him and then throws a first ball. It is assumed that five pins were fallen. Then, the apparatus for producing an information concerning the result of throw 12 produces an information indicating that nine pins were fallen, and counter 13 counts nine and sends this data to AND gate circuit 14. When the memory digit for the first frame of the shift register 16 arrives at its output section 16n, frame detector 21 sends a frame designation signal to AND gate circuit 14 for storing the information which indicates that nine pins were fallen by the first throw in the first frame section of the shift register 16. By the shifting operation of the shift register 16, the information in the first frame section is shifted to the output section 16n, so that information An indicating that nine pins were fallen by the first throw is sent to the count pulse generator 32 and the display control device 58 as diagrammatically shown in FIG. 1 whereby a digit 9 is displayed in the position for the first throw at the first frame of the score sheet of the player P as shown in FIG. 6. Under these conditions, since the second throw at the first frame is not yet made, the nth frame termination detector 39 does not produce any signal so that AND gate circuit 36 is held in its disenabled state for blocking the signal from the count pulse generator 32.

When the player throws the second ball of the first frame, since this second throw is erroneous as shown in FIG. 5, the counter 13 sends to the shift register 16 a signal indicating that the number of the pins fallen is zero and this result is displayed by display device 59 as shown in FIG. 6. As the same time, an nth frame termination detection signal is provided by detector 39. Since there is no strike and spare at the first frame, AND gate circuit 36 is enabled to send information generated by the count pulse generator 32 and indicating that the numbers of pins fallen by the first and second throws are 9 and 0, respectively, to counter 49 causing the same to count nine. This information is sent to display control circuit 58 from counter 49 and is then displayed by display device 59 as the score of the first frame.

When the player P sets again the player selector 10 and then throws the first ball of the second frame, the numerical data nine indicating the number of fallen pins is counted by counter 13 and the data nine indicating the number of pins fallen by the first throw is stored in the second frame section of the shift register 16. As shown in FIG. 6, this data is displayed as the second frame-first throw. Under these conditions, the score in the first frame section is displayed when the memory in the first frame section is sent to the output section 16n by the shifting operation of shift register 16. Then the result of the first throw of the second frame is displayed. If the result of the second throw were a spare, the content of the second frame would be detected by spare detector 18 as the content leaves the section 16*n* + 2 of the shift register 16 and the information stored in the second frame section is shifted to the output section 16*n*, a spare signal SPn will be produced. This spare signal SPn is applied to display control circuit 58 to display the spare mark at the position of the display device 59 for indicating the second throw of the second frame. As the same time, the spare signal SPn is also sent to AND gate circuit 54 via OR gate circuit 53. At this time, however, since the first throw of the third frame which is the bonas point for the spare is not yet made the $(n + 1)$th frame termination detector 40 does not produce any output so that AND gate circuit 54 is held in its disenabled state thus preventing display of the score of the second frame. When throw of the third frame is completed and the detector 40 produces an output AND gate circuit 54 is enabled in synchronism with the clock pulse $\phi_{12}$ which provides spare signal SPn whereby the count of the tens digit counter 50 to sum up the score. At the same time the information regarding the next frame that is the information regarding the first throw of the third frame is derived out of the count pulse generator 33 through AND gate circuit 42 thus summing up the counts by counter 49. Thus, counters 49, 50 and 51 operate to sum up the counts of the first to third frames, that is nine pins of the first frame, ten pins of the second frame and the bonas point of the first throw of the third frame or ten pins representing a strike of the third frame, and the total number 29 is sent to the display apparatus as a display signal.

In this manner, the results of respective throws are sequentially written in the dynamic shift register 16 as the game proceeds, and these results are read out from the output section 16n and displayed by the display device 59 as the contents of the register 16 are shifted. Thus the results of respective throws drive directly the display control circuit 58 and are displayed by the display device 59 in accordance with the information read out from the shift register 16. Each time the information of the respective frames is read out, the numbers of fallen pins are summed up and at the time of a strike or a spare the bonas counts of the first and second throws or the first throw are summed up starting from the first frame and the total count is displayed together with the result of the throw of the corresponding frame section. With the progress of the game, the display is changed as shown in the table of FIG. 6. If desired, the score of one game may be recorded on a score sheet, as shown in FIG. 5.

The addition operation of the bonas points for the purpose of displaying the scores of respective frames is as follows. Where the frame information arriving at the output section of the dynamic shift register 16 corresponds to a strike, the strike detector 19 produces a strike signal STn which displays the strike of that frame, while at the same time a signal is applied to AND gate circuit 45. Further, the count signals corresponding to the first and second throws in the information stored in the section 16n + 1 of the shift register 16 are also supplied to AND gate circuit 45 from the count pulse generator 33. After confirming the fact that the frame is not a strike by the output of inverter 44, the signals of the first and second throws are derived out through AND gate circuit 45 and are added at the counter 49. At this time, the strike signal STn is applied to AND gate circuit 54 via OR gate circuit 53. AND gate circuit 54 is enabled by clock pulse $\phi_{12}$ upon completion of the $(n + 1)$th frame thus adding the data 10 of information AN representing the number of fallen pins.

When the information An + 1 represents a strike, a strike signal STn + 1 is produced by strike detector 17, thus disenabling AND gate circuit 45, enabling AND gate circuit 47 and adding the signal of the first throw of the succeeding frame An+2 or the second signal of the second throw following frame An as a bonas point. At the same time, a signal from AND gate circuit 47 is applied to AND gate circuit 55 which is enabled by the signal from the $(n + 2)$th frame termination detector 41 and clock pulse $\phi_{11}$ for adding the bonas point 10 of the frame An+1.

In this manner, when the information of the tenth frame is read out of the output section 16*n* with the progress of the shifting operation of the shift register 16 the result of the throw is displayed. When the first throw is a strike, the signals of the second and third throws are read out and summed up by the operation of counters 49, 50 and 51, whereby the total count is displayed by the display device 50. At this stage of operation, reset circuit 57 produces a reset pulse thus resetting all of the counters 49, 50 and 51. Now the apparatus prepares for the new shift by the next first frame. Under these conditions, only the information in the shift register 16 regarding the results of the second and third throws of the tenth frame is displayed and counting of the score is terminated at the tenth frame.

The display device 59 is constructed such that it is driven for display by a series of display signals which are applied thereto with the progress of the shifting operation of the shift register 16. With this construction, however, the scores are only temporarily displayed. Accordingly, the display signals are selectively applied to a printer, not shown, for obtaining a printed record of the score after the game is finished. The printer may be any printing device which is driven by the display signals. Alternatively, the display of the display device 59 may be directly copied. However, by using the printer, it is possible to effectively supervise a plurality of printed records. By connecting the display signal lines of respective frames to the central printing device, and by selecting a desired signal, the record of any frame score can be obtained.

Figure 7:
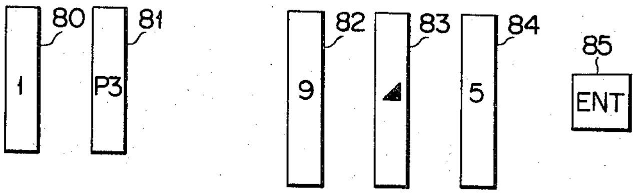
FIG. 7 is a diagrammatic representation of dials for correcting the content of the score.

As above described, according to this invention, the results of respective throws are stored in only the dynamic shift register 16 so that if the content stored therein is not correct, such error can be readily corrected by providing on the panel board of the display device 59 a correction frame dial 80 and a player dial 81, further a fallen pin dials 82, 83 for the first and second throws and 83 for the third throw of the tenth frame as shown FIG. 7, thus setting the information of players, frame address and the fallen pins for rewriting the content of the shift register. Reference numeral 85 designates an input key. By changing the content of the shift register 16 it is possible to calculate the score in accordance with the shifting operation of the shift register 16 thereby automatically correcting the display of the score.

Where a bonas strike is given in a handicap game, it is possible to use the apparatus efficiently by writing a strike in a particular frame section by providing a correction dial for the shift register 16.

A single display device which displays the signals from the display control circuit 58 may be used in common for a plurality of processing apparatus 11 in which case the signals are read out by scanning them. By switching shift register read out signal circuits assigned for respective players in synchronism with the switching of the display scanning operation it is also possible to use a single score sum up circuit in common for a plurality of shift registers.

Although in the embodiment shown in FIG. 1 the information regarding the result of throws is produced by the information producing apparatus interlocked with the pin setter, the apparatus 12 may be substituted by a ten key device, for example, for manually preparing the information regarding the result of the throw and by applying this information to counter 13. Further, it is also possible to automatically apply the signal of the first throw and to manually apply the signal of the second throw.

Although in the above described embodiment 12 bits were assigned for each frame in shift register 16 it is also possible to assign 8 bits for each frame and four bits may be used to store respective information of the first and second throws. In this case it is possible to readily obtain the contents of a strike, a spare, gutter, etc, as codes by using 1–2–4–8 codes wherein digits from 0 to 10 are represented by four bits by using weighing technique. Moreover, the results of the first throw and the second throw are expressed by four bit signals, so that detection of said results can readily find whether said results represent the first or second throw, thus simplifying the construction of the apparatus.

What is claimed is:

1. Apparatus for automatically processing the scores of bowling games comprising:

information input means for feeding information concerning the number of fallen pins after the throwing of each ball;

a dynamic shift register connected to said means and arranged to continuously store information from said information input means in the order of game frames for at least one game;

means for successively and cyclically reading out the stored information from an output section of said dynamic shift register;

means for successively summing up the number of signals representing fallen pins which are derived from said read out information starting from the first game frame;

discriminating means for delivering a strike signal and a spare signal from said information concerning the number of fallen pins after the throwing of each ball read out from said output section;

means responsive to the output signal from said discriminating means for reading out the information concerning the results of the first throw or first and second throws succeeding to said fallen pins information in each frame read out from said output section;

a sum up counter for adding the number of signals representing fallen pins, corresponding to said read out information, to the result of the operation of said sum up means; and dynamic display means for successively displaying the information cyclically read out from said dynamic shift register and said sum up counter for respective game frames.

* * * * *